(12) United States Patent
Simpkins, Jr. et al.

(10) Patent No.: US 9,099,008 B2
(45) Date of Patent: Aug. 4, 2015

(54) MOTION PLATFORM FOR USE WITH A VIDEO SIMULATION SYSTEM

(71) Applicant: Flyit Simulators, Inc., Carlsbad, CA (US)

(72) Inventors: Terry J. Simpkins, Jr., Carlsbad, CA (US); Terry J. Simpkins, Sr., Carlsbad, CA (US); Ralph Kelly Simpkins, Mammoth Lakes, CA (US)

(73) Assignee: FLYIT SIMULATORS, INC., Carlsbad, CA (US)

( * ) Notice: Subject to any disclaimer, the term of this patent is extended or adjusted under 35 U.S.C. 154(b) by 0 days.

(21) Appl. No.: 14/108,091

(22) Filed: Dec. 16, 2013

(65) Prior Publication Data

US 2015/0170541 A1  Jun. 18, 2015

(51) Int. Cl.
*G09B 9/00* (2006.01)
*G09B 9/46* (2006.01)

(52) U.S. Cl.
CPC ... *G09B 9/00* (2013.01); *G09B 9/46* (2013.01)

(58) Field of Classification Search
CPC .............. G09B 9/00; G09B 9/04; G09B 9/12; G09B 9/14; A63G 31/02
USPC ....................................... 434/11–72
See application file for complete search history.

(56) References Cited

U.S. PATENT DOCUMENTS

| | | | | |
|---|---|---|---|---|
| 4,917,610 A | * | 4/1990 | Whiteman | 434/33 |
| 5,605,462 A | * | 2/1997 | Denne | 434/55 |
| 5,829,982 A | * | 11/1998 | Advani et al. | 434/58 |
| 6,056,362 A | * | 5/2000 | de la Haye | 297/314 |

* cited by examiner

*Primary Examiner* — Timothy A Musselman
(74) *Attorney, Agent, or Firm* — Coastal Patent Law Group, P.C.

(57) ABSTRACT

A motion platform for use with a video simulation system is described. The platform is configured to provide simultaneous roll-axis and yaw-axis motion about a pivot point for simulating a aircraft environment. Additionally, the motion platform is configured to achieve motion using a single linear actuator, and thus is provided at a significantly reduced cost compared to conventional motion platforms. Other benefits of the motion platform include improved power efficiency, reduced weight for increased portability, and reduced maintenance due to only one linear actuator driving the system.

16 Claims, 7 Drawing Sheets

MOTION PLATFORM FOR USE WITH A VIDEO SIMULATION SYSTEM

BACKGROUND

1. Field of the Invention

The claimed invention relates to motion platforms for video simulation equipment; and more particularly, to a mechanical platform and related components being configured to simulate simultaneous yaw and roll motion for use in such video simulation equipment.

2. Description of the Related Art

Video simulation systems are becoming increasingly popular for applications such as video gaming and operator skill and developmental training. Such video simulation systems are generally designed to mimic an object environment for a targeted application. For example, video simulators have been proposed for simulating the dynamics of aircraft, marine vessels, locomotives and automobiles. In each of these examples, the objective of the video simulation system is to mimic visual and motion characteristics of an environment associated with operation of the object under simulated conditions.

For purposes herein, a particular interest is aimed at yaw motion about a vertical axis and roll motion about a horizontal axis for simulating motion characteristics of aircraft and marine vessels, and more particularly such motion for helicopter simulation.

It is important to accurately simulate the dynamics of an object environment, especially where the associated application is flight operator training. The idea being that the operator experience within the simulator must closely resemble real-world conditions in order to build adequate experience, skill and to anticipate reactions of the operator in preparation for a real-world event or condition.

Currently available systems have yet to provide a cost effective and adequate yaw and roll motion simulation platform. To be cost effective, it would be beneficial to provide such a platform with relatively few moving components. Moreover, it is a need in the art to overcome the challenges of providing fewer mechanical parts while maintaining adequate motion simulation. Thus, there is an ongoing need for improved motion platforms for use with video simulation systems, especially such platforms configured for roll-motion and yaw-motion simulation, and further configured for low cost, simple and effective mechanical motion simulation.

SUMMARY

A motion platform for use with a video simulation system is described. The motion platform is configured to provide simultaneous and constantly varying roll-axis and yaw-axis motion about multiple pivot points for simulating a helicopter aircraft or similar environment. Additionally, the motion platform is configured to achieve roll and yaw-motion using a single linear actuator, and thus is provided at a significantly reduced cost compared to conventional multi-actuator motion platforms. Other benefits of the motion platform include improved power efficiency, reduced weight for increased portability, and reduced maintenance due to only one linear actuator driving the system, among others.

BRIEF DESCRIPTION OF THE DRAWINGS

The claimed invention can be further understood upon a thorough review of the following detailed description in conjunction with the appended drawings, wherein:

DETAILED DESCRIPTION

Figure 1:
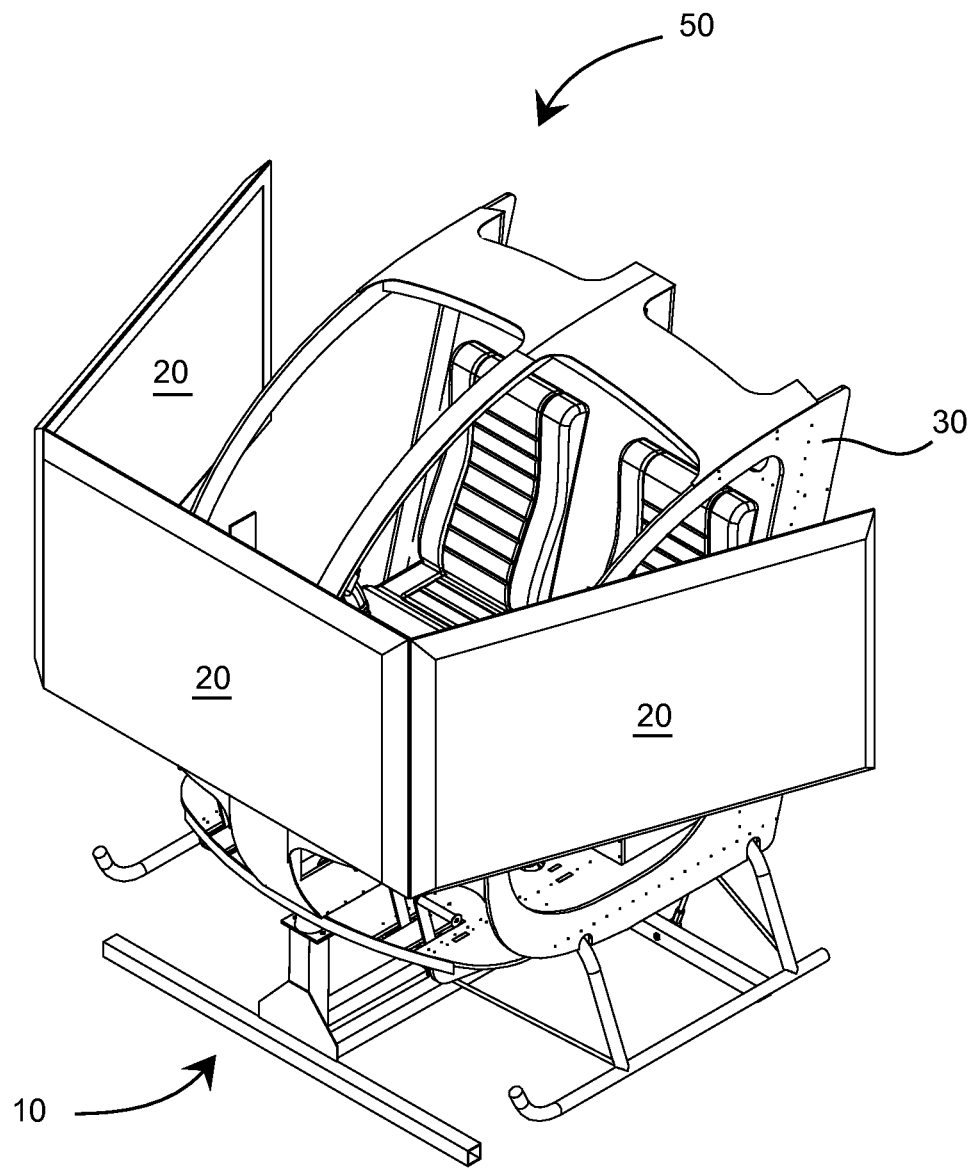
FIG. 1 shows a video simulation system in accordance with an illustrated embodiment.

In the following description, for purposes of explanation and not limitation, details and descriptions are set forth in order to provide a thorough understanding of the claimed invention. However, it will be apparent to those skilled in the art that the claimed invention may be practiced in other embodiments that depart from these details and descriptions without departing from the spirit and scope of the invention. Certain embodiments will be described below with reference to the drawings wherein illustrative features are denoted by reference numerals.

A motion platform suited for low-cost production and effective motion simulation within a video simulation system is disclosed. The motion platform comprises a single actuator, resulting in low-cost implementation, reduced power consumption, reduced weight for improved portability, simplified servicing or replacement, and improved longevity with reduced maintenance.

In one embodiment, referenced herein as a "technology advanced flight motion system", the motion platform includes: an articulating floor-mounted structure supporting a simulator cockpit through two acentric rotating arms mounted at the rear. A single forward mounting point allows the cockpit to rotate right and left in a horizontal plane and to roll clockwise and counter clockwise.

The technology advanced flight motion system creates a sensation of being supported on air or other fluid medium such as water. Acentric mounted pivoting arms support the cockpit, rotating right to left about a fixed pivot. This results in a compound simultaneous acentric yaw and roll, being flatter in the center and accelerating as it approaches the ends of the right/left rotation. This results in a constant-varying simultaneous yawing and rolling motion. The unique mechanism allows an accurate motion and feeling of coordinated and uncoordinated turns in a skid or slide. Uncoordinated turns are a major cause/contributor to aviation accidents.

This compound motion is driven by a single linear actuator that is programmed to simulate turbulence ranging from extremely light to severe. The programming of light turbulence to be always active when the aircraft is in simulated flight, no fixed point or position is ever experienced. This compound motion simulates the feeling of being supported in a fluid medium of constantly moving body of air or water.

Now turning to the drawings, FIG. 1 illustrates a video simulation system 50 including a motion platform 10, a cockpit 30 coupled to the motion platform, and a plurality of video display panels 20. In this embodiment, the video simulation system resembles a helicopter, but it should be noted that the motion platform provides simultaneous roll-axis and yaw-axis motion simulation capable of use with an alternative aircraft or marine vessel object environment.

Figure 2:
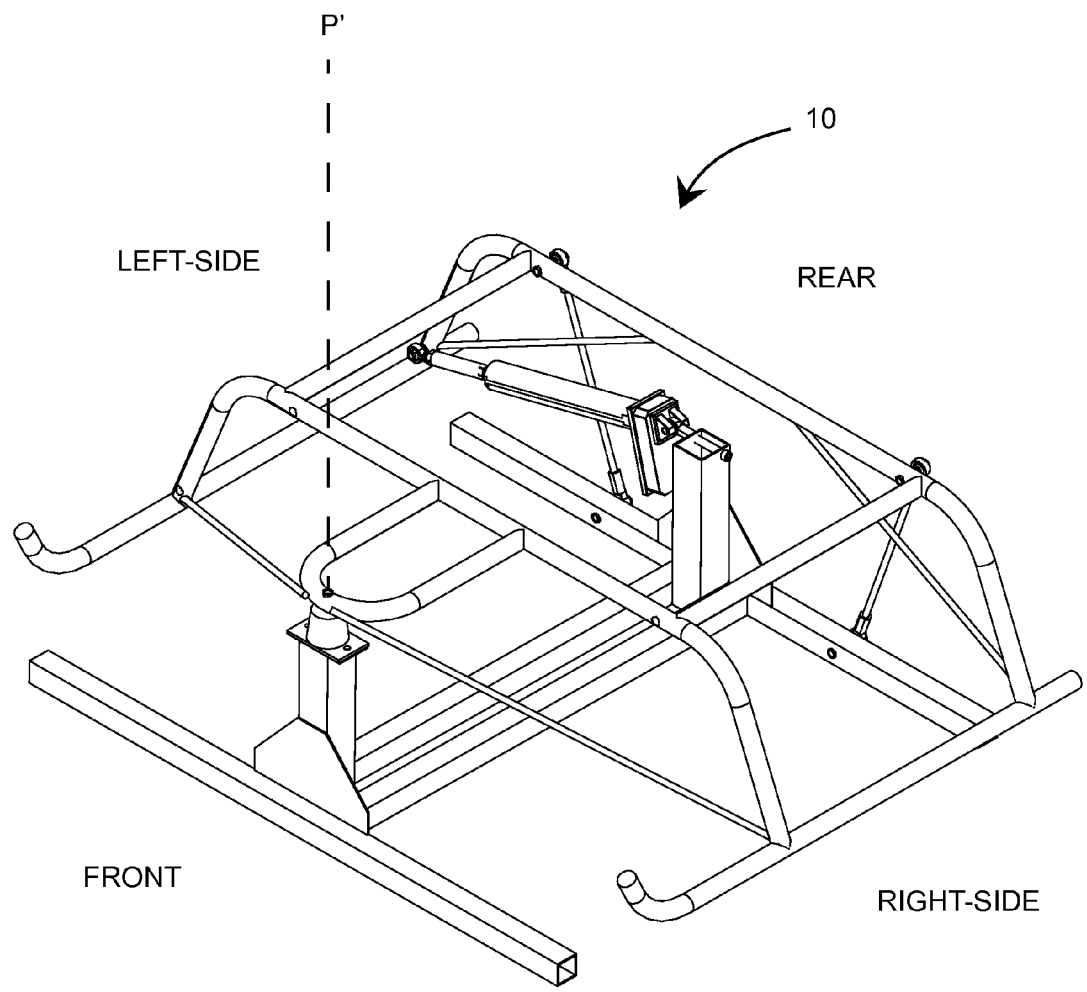
FIG. 2 shows a motion platform for use with a video simulation system of the illustrated embodiment.

FIG. 2 shows the motion platform 10 in accordance with the illustrated embodiment of FIG. 1. The motion platform is shown with a front-side, rear-side, left-side and right-side as labeled.

Figure 3:
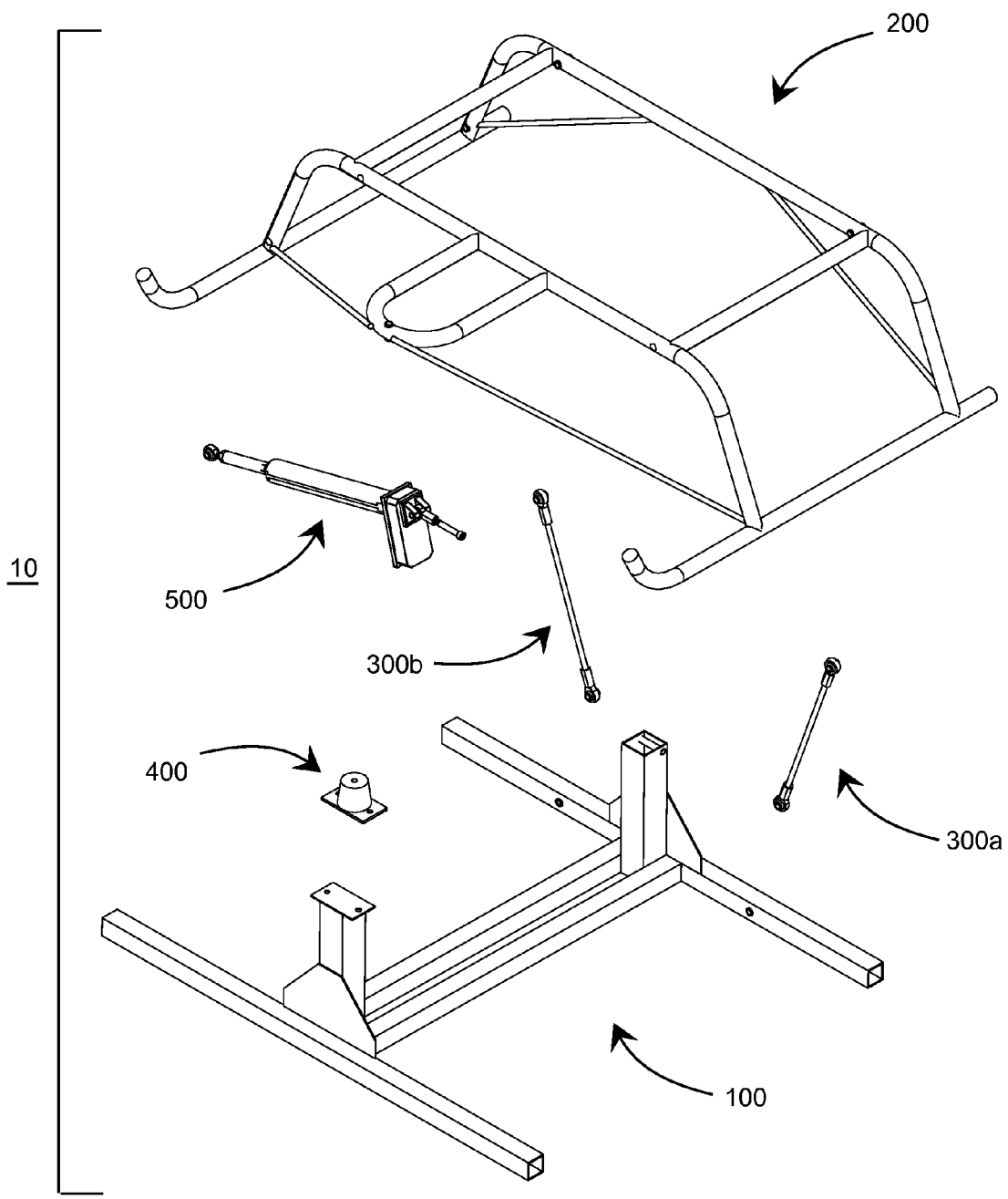
FIG. 3 shows an exploded view of the key components making up the motion platform of the illustrated embodiment.

FIG. 3 shows the motion platform 10 in an exploded view illustrating several key components thereof. The motion platform comprises a base 100, a chassis 200, a pivot 400 configured to couple with each of the base and the chassis, a linear actuator 500, and a pair of linkages including a first linkage 300a and a second linkage 300b each being configured to couple with the base and the chassis.

Figure 4A:
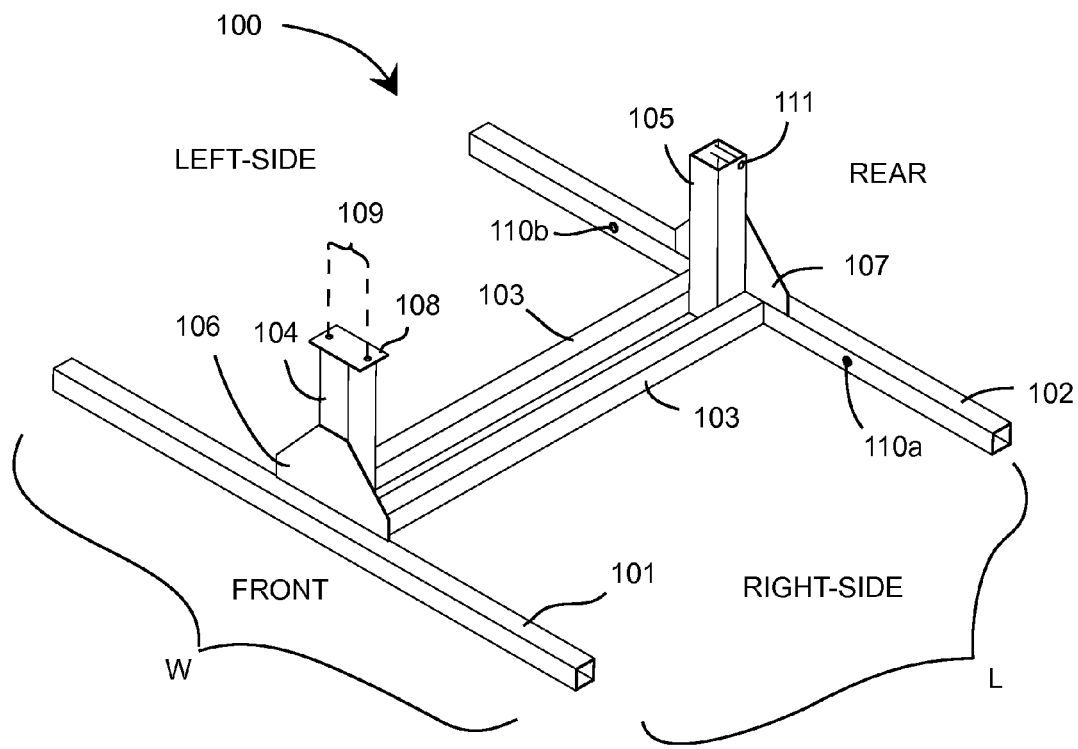
FIG. 4A shows a perspective view of a base from the components of the illustrated embodiment.
Figure 4B:
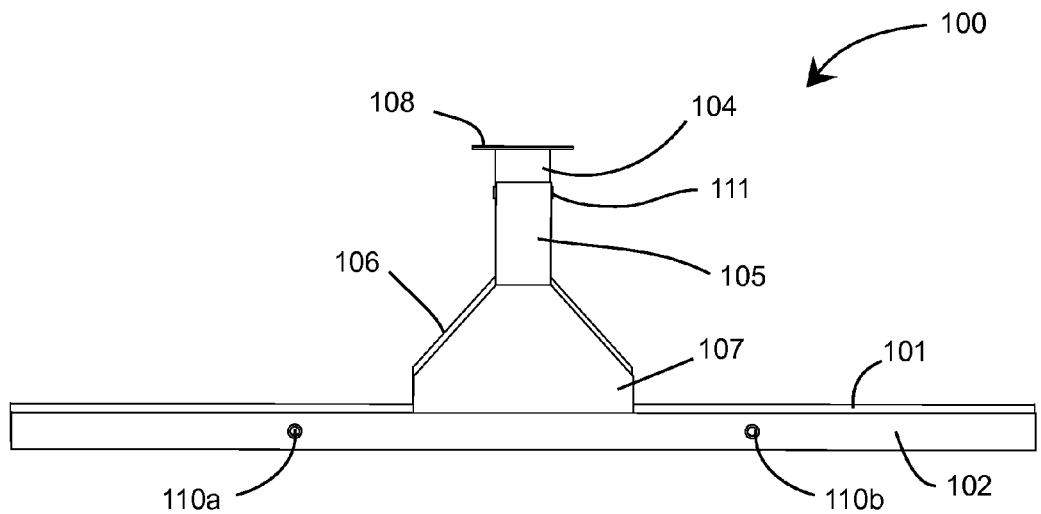
FIG. 4B shows a rear view of the base.

In accordance with one embodiment, FIG. 4A shows a perspective view of the base 100, while FIG. 4B shows a rear view of the base. As shown in FIGS. 4(A-B), the base 100 comprises:

a first lateral support member 101 extending along a width W of the base from a left-side to a right-side;

a second lateral support member 102 extending along the width of the base, the second lateral support member being parallel with the first lateral support;

a pair of longitudinal support members 103a; 103b extending along a length L of the base from a front-side to a rear-side, each of the longitudinal support members being coupled with the first lateral support member at the front-side and further coupled with the second lateral support member at the rear-side;

a first vertical post 104 extending vertically from a center of the base at the front-side thereof, and a second vertical post 105 extending vertically from the base at the rear-side.

In certain embodiments, the base can be reinforced for additional support with a front support plate 106 being attached to the first lateral support member and the first vertical post. Similarly, a rear support plate 107 can be attached to the second lateral support member and the second vertical post. Various sizes and designs of the plate can be implemented to provide additional support for carrying a load above the vertical posts and respective lateral and longitudinal support members of the base.

In various alternative embodiments envisioned by those with skill in the art (not shown), the base may comprise a v-shaped leg assembly having a center, a first leg extending outwardly from the center, and a second leg extending outwardly from the center, the first and second legs forming an angle therebetween. The v-shaped leg assembly can be substituted for one or both of the lateral support members. Thus, the design of the lateral support members and longitudinal support members can be readily altered in various configurations that may depart from the illustrated preferred embodiment.

The first vertical post 104 further comprises a means for attaching the chassis and an associated bushing, such as a pivot busing. As shown, the first vertical post comprises a pivot plate 108 disposed at a top end of the first vertical post and configured with a pair of pivot plate apertures 109 for attaching a pivot to the base.

The second lateral support member 102 further comprises a pair of bottom linkage nodes, including a first bottom linkage node 110a and a second bottom linkage node 110b. Each of the first and second bottom linkage nodes may comprise a through-hole for receiving a bolt or other attachment device for attaching a bottom end of a respective linkage, or any other means for attaching a linkage.

The second vertical post 105 further comprises an actuator node 111. The actuator node may comprise a through-hole for receiving a bolt or other attachment device for attaching a linear actuator, or any other means for attaching an actuator.

In the illustrated embodiment, metal tubing such as steel tubing is used to fabricate each of the first and second lateral support members, the longitudinal support members and the vertical posts. The hollow tubing is commercially available and suitable for fabrication of the base. However, any composite material, hollow tubing or otherwise, or an alternative metal, wood, or other material may be used to fabricate the base components.

Other configurable implementations may include positioning the bottom linkage node 110a and second bottom linkage node 110b at a first distance therebetween, and further positioning the first upper linkage node 202a and second upper linkage node 202b at a second distance therebetween, such that the linkages being coupled therewith can be angled to simulate a particular roll-axis and yaw-axis motion. Thus, in one embodiment, the second distance is greater than the first distance such that as the motion platform yaws out the corresponding roll motion is downward clockwise to the right and counter clockwise to the left.

Figure 5:
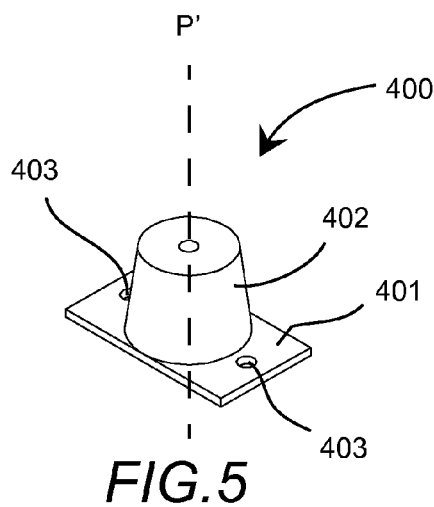
FIG. 5 shows a pivot from the components of the illustrated embodiment.

FIG. 5 illustrates a pivot according to an embodiment. The pivot 400 comprises a pivot base 401, and a pivot bushing 402 attached to the pivot base. The pivot base 401 is shown with pivot base apertures 403, a bolt or other attachment means (not shown) extends through the pivot base apertures 403 and the pivot plate apertures 109 for attaching the pivot to the base 100. The pivot base is generally fabricated from a metal plate, whereas the pivot bushing is generally a molded plastic or similar soft volume for facilitating a rotational pivot motion between the chassis 200 and the base.

A pivot axis P' extends vertically through the pivot. The motion platform is configured to provide simultaneous roll-axis and yaw-axis motion, the yaw axis motion produced about the pivot axis.

Figure 6:
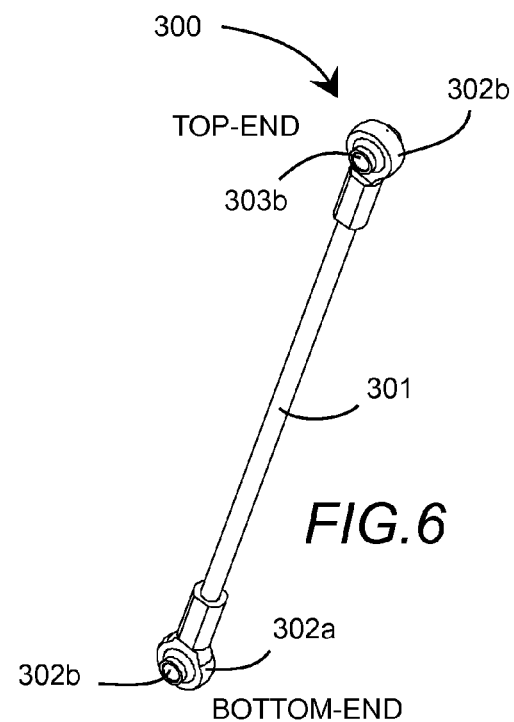
FIG. 6 shows a linkage from the components of the illustrated embodiment.

FIG. 6 shows a linkage in accordance with various embodiments. Each of the first and second linkages 300a; 300b, respectively, are similar in form and function but may individual comprise a distinct length depending on the desired movement. The linkages generally comprise a linkage rod 301 extending from a bottom end to a top end of the linkage, a first eyelet 302a disposed at the bottom end and a second eyelet 302b disposed at the top end, a first spherical bearing 303a housed within the first eyelet 302a and a second spherical bearing 303b housed within the second eyelet 303b. Although spherical bearings and eyelets are shown, a simple rod with apertures disposed at each end of the rod may be used. Several embodiments are possible; however the preferred embodiment is as shows since such linkages are commercial available.

Figure 7:
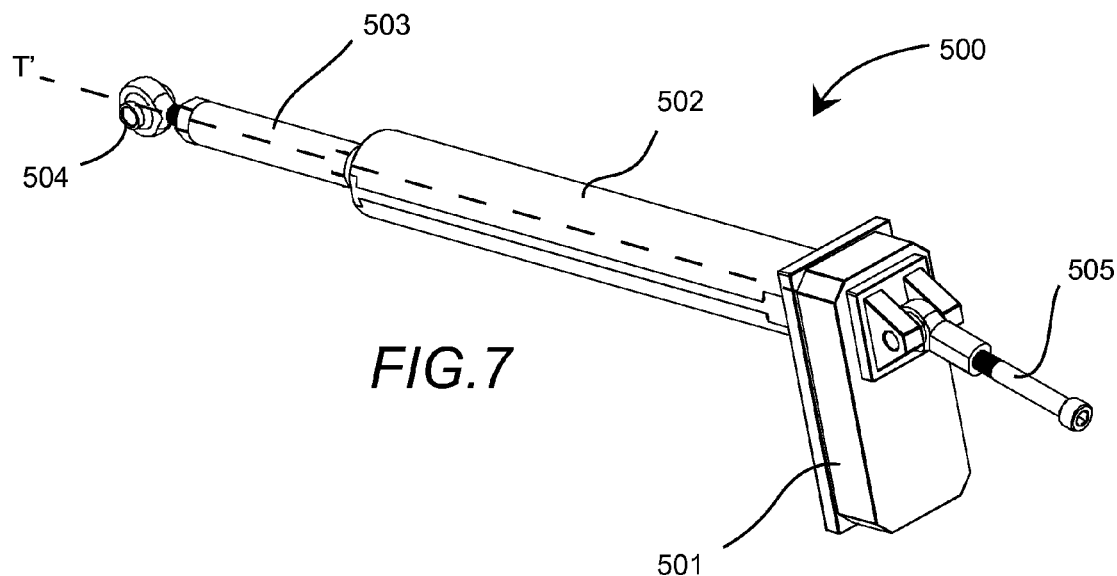
FIG. 7 shows a linear actuator from the components of the illustrated embodiment.

FIG. 7 shows a linear actuator in accordance with an embodiment. Several linear actuators are commercially available and may be implemented with little design experimentation. However, for purposes of illustration the linear actuator 500 may generally comprise an actuator mechanism 501 (hydraulic, electric or other) an actuator body 502, an actuator shaft 503 extending from the actuator body and configured to translate therethrough, and an actuator bearing 504 at a distal end of the linear actuator (such as a spherical bearing or other bearing). Note a translational axis T' shown extending through the actuator shaft, the linear actuator is configured to translate the shaft about the bod along the translational axis T'.

The linear actuator may further comprise an actuator linkage 505. The actuator may be coupled to the actuator node 111 of the base at the actuator linkage 505, and further coupled to the chassis at a side thereof, or more preferably, at a rear corner thereof.

Figure 8A:
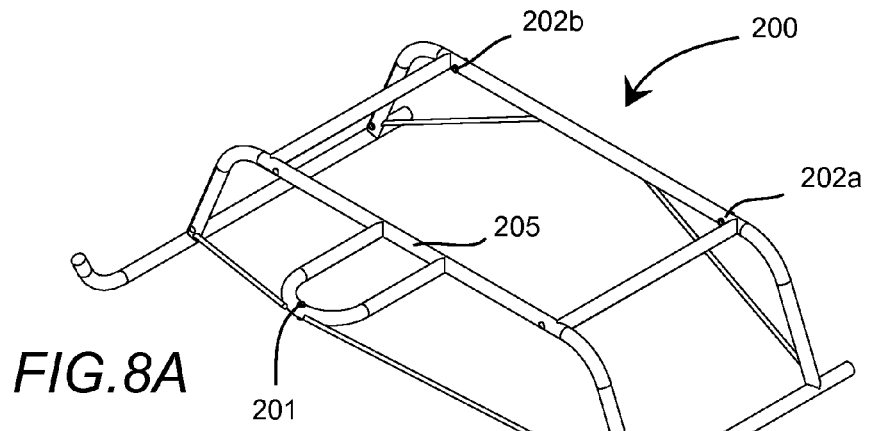
FIG. 8A shows a perspective view of a chassis from the components of the illustrated embodiment.
Figure 8B:
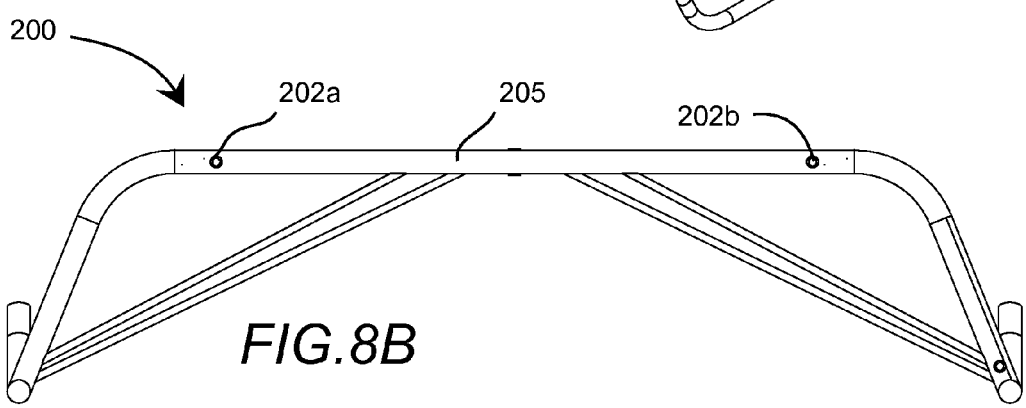
FIG. 8B shows a rear view of the chassis.
Figure 8C:
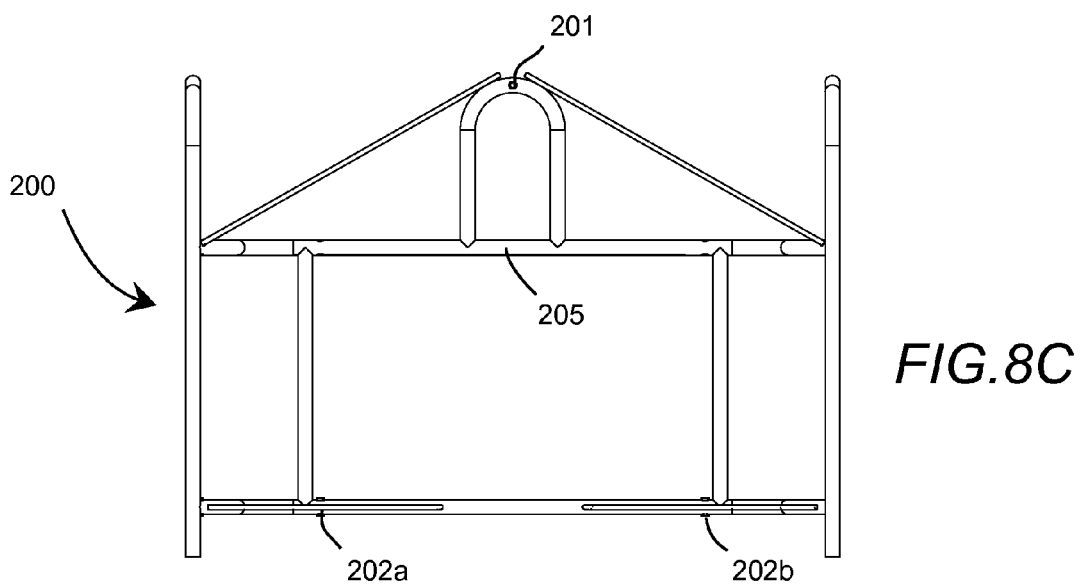
FIG. 8C shows a bottom view of the chassis.

FIGS. 8(A-C) illustrate the chassis in accordance with an embodiment. FIG. 8A shows a perspective view, FIG. 8B shows a rear view, and FIG. 8C shows a top view of the chassis. The chassis generally includes a rigid frame structure 205; here the chassis resembles a skid of a helicopter however another structure can be similarly incorporated. The chassis comprises: the rigid frame structure 205 having a pivot node 201 centered between the left and right sides of the chassis at a front end, a first upper linkage node 202a and a second upper linkage node 202b disposed along a rear side of the chassis.

Figure 9A:
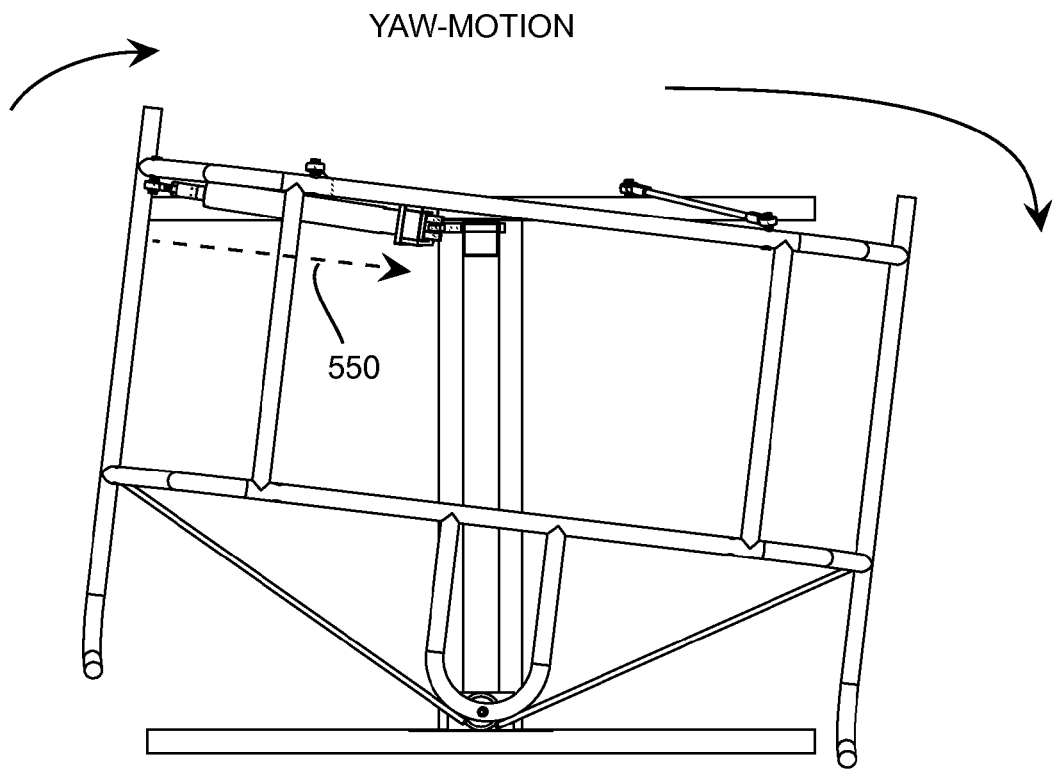
FIG. 9A shows yaw-motion of the motion platform.
Figure 9B:
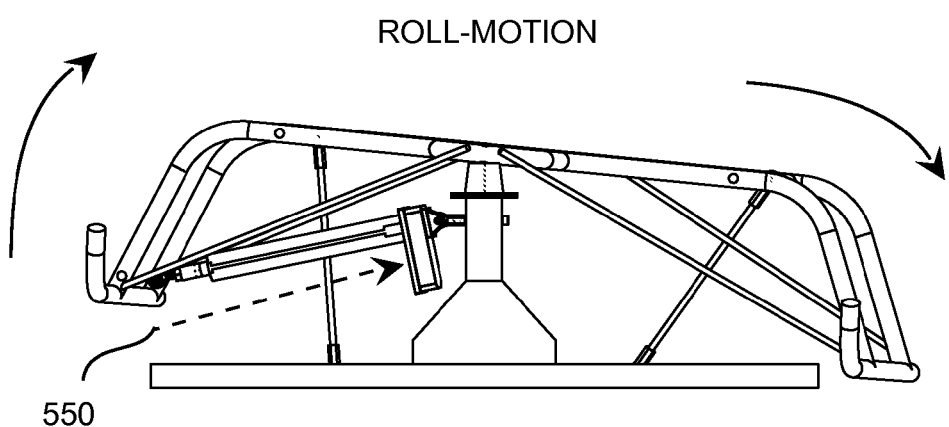
FIG. 9B shows roll-motion of the motion platform.

FIG. 9A shows yaw-motion of the motion platform, with the platform being yawed with respect to the base. The yaw-motion is achieved by a single linear actuator, which is configured to translate along the translational axis. Here, the linear actuator is contracted as indicated by dashed-arrow 550. Solid arrows indicate direction and magnitude of the yaw movement. FIG. 9B shows roll motion of the platform. The roll-motion is also achieved by the single linear actuator. The linear actuator is contracted as indicated by dashed-arrow 550. Solid arrows indicate direction and magnitude of the roll movement.

As the linear actuator expands/contracts, the chassis moves about the pivot and the first and second linkages to produce a combined yaw and roll movement. The yaw motion is derived in a horizontal plane about the pivot, and has yaw motion components associated with each of the linkages. Note that as each linkage approaches a horizontal orientation, the yaw component is minimized and a roll component is maximized. Moreover, as each linkage approaches a vertical orientation, the roll component is minimized and the yaw component is maximized. Thus, as the chassis moves about the base, roll is intensified as a function of the yaw movement. In this regard, the chassis is configured for simultaneous and constantly varying yaw and roll motion about the base.

It is important to note that the motion platform achieves a combined yaw and roll movement that accurately simulates the movement of helicopters, among other applications, and provides such simulation using a single linear actuator, thereby reducing costs and maintenance associated with the motion platform.

The relation of yaw and roll in the dynamics of the motion platform are configured by adjusting the fixed position and orientation of the linkages with respect to one another, the size of the linkages, the angles between each linkage and the chassis, the angles between each linkage and the base, the length of the chassis, and the fixed position, size and orientation of the linear actuator with the chassis disposed in a home position (centered and level above the base).

Now, although particular features and embodiments have been described in an effort to enable those with skill in the art to make and use the claimed invention, it should be understood that several variations, alterations or substitutions can be achieved to integrate the motion platform for use with a variety of motion simulation environments. Nothing in this description shall be construed as limiting the spirit and scope of the invention as set forth in the appended claims, below.

FEATURE LIST (10) motion platform
(20) display panel
(30) cockpit
(50) video simulation system
(100) base
(101) first lateral support member
(102) second lateral support member
(103) longitudinal support members
(104) first vertical post
(105) second vertical post
(106) front support plate
(107) rear support plate
(108) pivot plate
(109) pivot plate apertures
(110a) first bottom linkage node
(110b) second bottom linkage node
(111) actuator node
(200) chassis
(201) pivot node
(202a) first upper linkage node
(202b) second upper linkage node
(205) rigid frame structure
(300a) first linkage
(300b) second linkage
(301) linkage rod
(302a; 302b) eyelets
(303a; 303b) spherical bearings
(400) pivot
(401) pivot base
(402) pivot bushing
(403) pivot base apertures
(500) linear actuator
(501) actuator mechanism
(502) actuator body
(503) actuator shaft
(504) actuator bearing
(505) actuator linkage
(550) contracted actuator
(L) length
(P') vertical pivot axis
(T') translational axis
(W) width

What is claimed is:

1. A motion platform for use with a video simulation system, comprising:
    a base configured to span up to an area associated with the video simulation system, the base comprising:
        a first lateral support member extending along a width of the base from a left-side to a right-side;
        a second lateral support member extending along the width of the base, the second lateral support member being parallel with the first lateral support member;
        at least one longitudinal support member extending along a length of the base, the at least one longitudinal support member being coupled with the first lateral support member at a front-side and further coupled with the second lateral support member at a rear-side;
        a first vertical post extending vertically from a center of the base at the front-side thereof, and
        a second vertical post extending vertically from the base at the rear-side;
    a pivot coupled to the first vertical post of the base at a top end thereof;

a first linkage having a first end thereof coupled to the rear side of the base and a second end opposite of the first end;
a second linkage having a first end thereof coupled to the rear side of the base and a second end opposite of the first end;
a chassis adapted to attach with a cockpit of the video simulation system, the chassis comprising:
a rigid frame structure having at least:
a pivot node configured for attachment with the pivot,
a first linkage node, the second end of the first linkage being attached to the chassis at the first linkage node, and
a second linkage node, the second end of the second linkage being attached to the chassis at the second linkage node; and
a linear actuator coupled to the second vertical post of the base and extending outwardly along a translational axis to further couple with the chassis;
wherein the chassis is configured for simultaneous roll-axis and yaw-axis motion about the base upon translation of the linear actuator.

2. The motion platform of claim 1, wherein said first and second linkages are coupled to the rear side of the base at a first distance therebetween.

3. The motion platform of claim 2, wherein the first and second linkages are coupled to the chassis at a second distance therebetween.

4. The motion platform of claim 3, wherein the second distance is greater than the first distance.

5. The motion platform of claim 1, wherein the linear actuator is coupled to the chassis at a rear corner thereof.

6. The motion platform of claim 1, wherein said chassis comprises a helicopter skid.

7. The motion platform of claim 1, wherein said yaw-axis motion is relative to a vertical axis through the pivot.

8. The motion platform of claim 1, wherein the motion platform comprises a single linear actuator for providing simultaneous roll-axis and yaw-axis motion simulation.

9. A motion platform for use with a video simulation system, comprising:
a chassis coupled to a base at a pivot, the pivot being disposed at a front side of the base and centered between a left and right side thereof, the pivot forming a vertical pivot axis extending upwardly therefrom, wherein the chassis is fixed at the pivot and configured to rotate about the vertical pivot axis for providing yaw motion;
a first linkage and a second linkage each extending from a rear side of the base to a rear side of the chassis, the first and second linkages configured to provide roll axis motion; and
a linear actuator extending from the base to the chassis;
wherein upon actuation of the linear actuator the chassis is configured for to provide simultaneous roll-axis and yaw-axis motion about the base.

10. The motion platform of claim 9, wherein said first and second linkages are coupled to the rear side of the base at a first distance therebetween.

11. The motion platform of claim 10, said first and second linkages are coupled to the rear side of the chassis at a second distance therebetween, wherein the second distance is greater than the first distance.

12. The motion platform of claim 9, wherein the linear actuator is coupled to the chassis at a rear corner thereof.

13. The motion platform of claim 9, wherein said chassis comprises a helicopter skid.

14. The motion platform of claim 9, wherein the motion platform comprises a single linear actuator for providing simultaneous roll-axis and yaw-axis motion simulation.

15. A motion platform for use with a video simulation system, comprising:
a base configured to span up to an area associated with the video simulation system, the base comprising:
a first lateral support member extending along a width of the base from a left side to a right side;
a second lateral support member;
at least one longitudinal support member extending along a length of the base, the at least one longitudinal support member being coupled with the first lateral support member at a front-side and further coupled with the second lateral support member at a rear-side;
a first vertical post extending vertically from a center of the base at the front-side thereof, and
a second vertical post extending vertically from the base at the rear-side;
a pivot coupled to the first vertical post of the base at a top end thereof;
a first linkage having a first end thereof coupled to the rear side of the base and a second end opposite of the first end;
a second linkage having a first end thereof coupled to the rear side of the base and a second end opposite of the first end;
a chassis adapted to attach with a cockpit of the video simulation system, the chassis comprising:
a rigid frame structure having at least:
a pivot node configured for attachment with the pivot,
a first linkage node, the second end of the first linkage being attached to the chassis at the first linkage node, and
a second linkage node, the second end of the second linkage being attached to the chassis at the second linkage node; and
a linear actuator coupled to the second vertical post of the base and extending outwardly along a translational axis to further couple with the chassis;
wherein the chassis is configured for simultaneous roll-axis and yaw-axis motion about the base upon translation of the linear actuator.

16. The motion platform of claim 15, wherein said second lateral support member comprises a center, a first leg extending outwardly from the center, and a second leg extending outwardly from the center, the first and second legs forming an angle therebetween.

* * * * *